(No Model.)

N. A. T. JONES.

APPARATUS FOR FILTERING AND PURIFYING WATER IN STEAM BOILERS.

No. 286,705. Patented Oct. 16, 1883.

Witnesses
H. J. Bingham
W. R. Whiteman

Inventor
N. A. T. Jones.

UNITED STATES PATENT OFFICE.

N. A. T. JONES, OF PLYMOUTH, MASSACHUSETTS.

APPARATUS FOR FILTERING AND PURIFYING WATER IN STEAM-BOILERS.

SPECIFICATION forming part of Letters Patent No. 286,705, dated October 16, 1883.

Application filed April 17, 1883. (No model.)

*To all whom it may concern:*

Be it known that I, N. A. T. JONES, of the town of Plymouth, county of Plymouth, in the State of Massachusetts, have invented a new and useful Improvement in Apparatus for Cleaning and Purifying Water in Steam-Boilers, of which the following is a specification.

Figure 2:
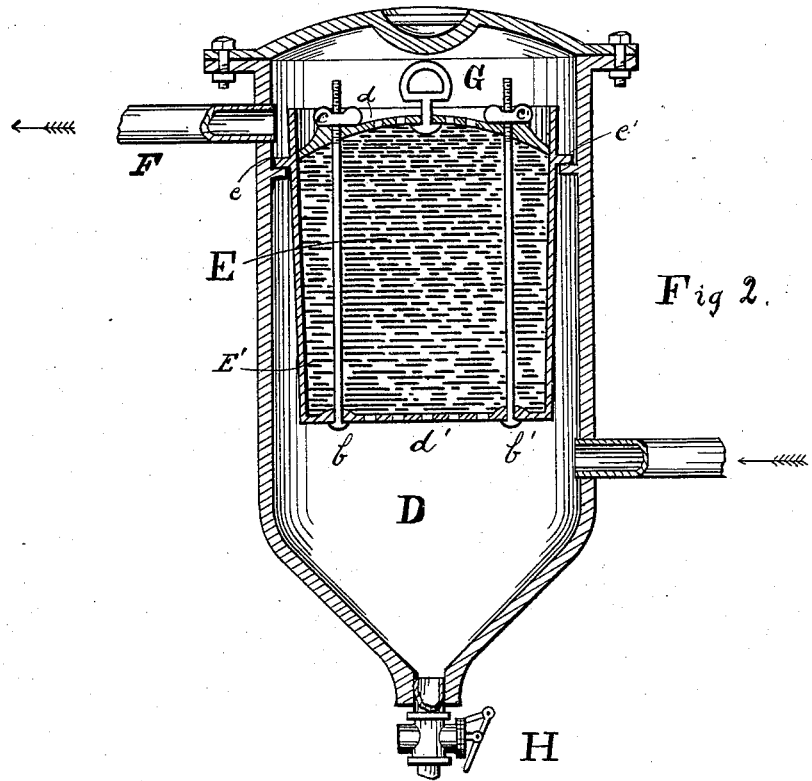
Figure 1:
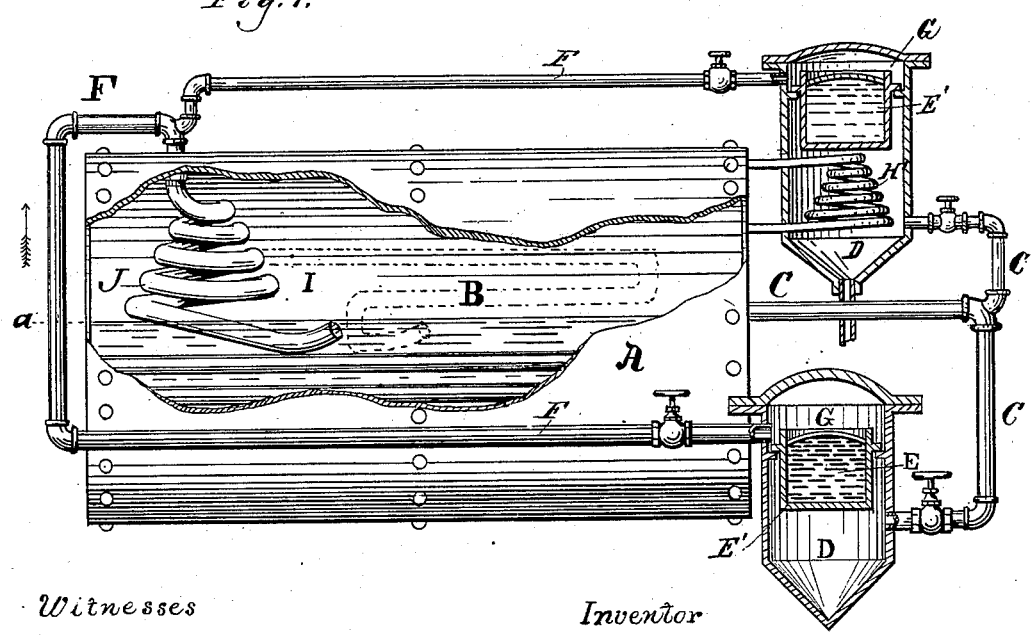

In the drawings, Figure 1 represents a horizontal steam-boiler with a portion of the shell broken away, showing the steam-space and water-line, with my cleaning and purifying apparatus and its external and internal pipes attached to it. (The filtering apparatus and external circulating-pipes are shown in two distinct forms, which will be explained hereinafter.) Fig. 2 represents a longitudinal sectional view of the filtering apparatus, the live-steam circulating-coil being omitted.

In Fig. 1, A is the boiler, with a portion of the shell broken away. B is the live-steam space. C is the outflow-pipe. D is the filtering apparatus. (The different parts of the filtering apparatus shown in Fig. 1 are designated by the same letters, with the exception of the live-steam circulating-coil, which is designated by the letter H'.) E' is the removable filter pail or reservoir. E is the filtering material. G is the pure-water chamber. F is the inlet-pipe from the filtering apparatus to the boiler. J is the coil-pipe in the steam-space of the boiler. The return-bend pipe is shown by dotted lines I.

In Fig. 2, D is the filter-reservoir. E' is the removable filter pail or reservoir. E is the filtering material. *d* is an adjustable perforated plate having an eye or handle in the center. *d'* is also perforated, and can be secure and form the bottom of the filter-pail, or it may be a removable plate. I prefer it to be secure and form the bottom of the filter-pail. *b* and *b'* are rods threaded at top, extending from the bottom of the filter-pail E' up through the filtering material E and through the adjustable perforated plate *d*. *c* and *c'* are fly-nuts for securing the perforated plate *d* down firmly onto the filtering material, to hold it securely packed. H is a valve in the blow-off pipe. *e* is the ledge on the filter-pail, that rests on the ledge *e'* on the side of the reservoir, having a rubber gasket between them to make a water-tight joint. The filter-pail is secured in place by screw-bolts or any other suitable device. G is the pure-water space. F is the inlet-pipe from the pure-water space of the filtering apparatus to the boiler. Outflow-pipe C from the boiler enters the filtering apparatus below the filter-pail.

The live-steam circulating-coil H' in the top filtering apparatus in Fig. 1, both ends of which enter the steam-space of the boiler, is to be used where the water is impregnated with the sulphate of lime or other impurities, where the water has to be maintained at a uniform high temperature to insure a thorough and perfect filtration. The lower filtering apparatus in Fig. 1 is to be used in ordinary cases where the above-named impurities do not exist, or only exist in a small degree.

I am aware that a live-steam circulating-coil has been used in a feed-water heater using exhaust-steam pipes extending up from the base, and having filtering material in top of heater, and claimed where interposed between the said exhaust-steam pipes and filtering material. Now I do not claim the use of live-steam circulating-coil in an apparatus where exhaust-steam pipes are used in combination with it in one and the same apparatus. What I do claim as my own, and wish to secure by Letters Patent, is the use of a live-steam circulating coil or pipe in a filtering and purifying apparatus where there are no exhaust-steam pipes used in combination with it in the same apparatus.

I am also aware that several devices intended to create a current of water from steam-boilers through exterior pipes and variously-constructed reservoirs and filtering apparatus and back through other exterior pipes to the boiler again have been patented, some of which operate on the siphon principle, others by passing the inlet-pipe to boiler through the furnace, and others by passing the inlet-pipe to the boiler into and through the water-space in the bottom of the boiler, all of which have proved to operate more or less imperfectly. Those operating on the siphon principle and those passing the inlet-pipe into the water-space of the boiler fail to secure the power of circulation required to attain the object intended. Where the inlet-pipe is passed through the furnace, it, being exposed to the intense heat, very soon becomes internally coated with scales and fills up entirely, is quickly burned out, or bursts. The apparatus is then useless until new pipes are supplied.

My invention avoids all the above-named and many other defects by a very simple and efficient device within the steam-space of the boiler, by which a very rapid and powerful circulation is obtained to force the water through the pipes and filtering apparatus outside the boiler with very little, if any, loss of heat. This rapid and powerful circulation is secured by a coil-pipe, return-bend pipe, or reservoir of any desired form, which will subject a large surface of water to the extreme heat of the live steam suspended in the steam-space of the boiler, connected at one end with the pipe F from the filtering apparatus outside of the boiler, and with the other end open either above or below the water-line in the boiler. The large body of water contained in the coil, return-bend pipe, or reservoir, being subjected to the extreme heat of the live steam, is rapidly converted into steam, which escapes through the opening into the boiler, creating by its escape a powerful suction within the pipe F, which causes the water from the exterior filtering apparatus, D, to flow into the pipe F to supply that which has been sucked out by the escaping steam, and the filtering apparatus is supplied in its turn from the boiler through the outflow-pipe C, connecting with the boiler at or near the surface of the water in the boiler, where most of the impurities collect while generating steam, thereby causing a constant, rapid, and powerful circulation of the water from the boiler, near the surface, through the external pipe, C, and filtering apparatus D, back into the boiler through the external pipe, F, and coil-pipe J, or return-bend pipe I, through the steam-space in the boiler, freeing the water by its constant passage through the filtering apparatus of all foreign matter that causes formation of scales or incrustation in steam-boilers. When the live-steam circulating-coil is not used, the filtering apparatus D can be supported in any convenient place or manner outside of the boiler; but when the live-steam circulating-coil is used the filtering apparatus must be situated high enough above the water-line in the boiler to allow a free return of the condensed water to the boiler, thus creating a lively circulation of steam through the live-steam coil. The water flows from the boiler through the pipe C into the exterior reservoir D, thence up through the filtering material E, securely packed in the filtering-pail E', into the pure-water chamber G, above the filter-pail, thence through pipe F into and through coil-pipe J, or return-bend pipe, I, into the boiler. All pipe-connections are below the cover of the filtering apparatus, so the cover can be removed by merely taking out the screws, or whatever device is used for fastening, and the filtering-pail taken out to be cleaned or to be replaced by another kept packed for the purpose, without interfering with any pipe-connections, and with but little trouble. When the filter-pail E' is packed and the perforated top d is screwed down firmly, it can be easily taken out of the apparatus by the handle in the top, and taken to any convenient place for cleaning, avoiding all litter and dirt in the boiler-room. A large portion of the impurities in the water settles in the bottom of the reservoir over the blow-off pipe, and the remainder is extracted by the filtering material in its passage through the filtering apparatus. If the filtering material should at any time become so foul as not to allow a free passage of the water, it can be easily freed by merely closing the valve in pipe C and opening the blow-off valve H, thus reversing the flow through the filter, which will free it perfectly. Charcoal, coke, or any other suitable filtering material may be used.

In the drawings, Fig. 1, pipe J is represented as a coil-pipe, the open end of which is below the water-line. I prefer this form, but can secure the same result by using a return-bend pipe or a metal reservoir suspended in the steam-space of the boiler. It is not absolutely necessary to have the open end of the pipe below the water-line in the boiler. As the water in the coil or return-bend pipe becomes converted into steam it can escape either into the steam-space or below the water in the boiler, as preferred. I do not confine myself to either exclusively, as the same result can be attained in both ways.

Having thus described my invention, I claim and desire to secure by Letters Patent of the United States—

1. In an apparatus for filtering and purifying water for steam-generators, the combination of a filtering-tank, D, with inflow-pipe C, leading from or near the surface of the water in steam-generator, an outflow-pipe, F, and a blow-off pipe, H, all provided with suitable valves, a removable filter-pail with perforated bottom and perforated cover, situated near the top of the tank, a live-steam circulating-coil pipe or pipes, both ends of which enter the steam-space of the steam-generator situated below the filter-pail in the tank, and a removable cover on top of the filter-tank, above all pipe-connections, substantially as shown and described.

2. In a water filtering and purifying apparatus, the combination of the filter D with external circulating-pipes, C and F, and the coil-pipe J or return-bend pipe I, suspended in the steam-space of the steam-generator, substantially as shown and described.

In testimony that I claim the foregoing as my own I have hereunto affixed my signature in presence of two witnesses.

N. A. T. JONES. [L. S.]

Witnesses:
WM. A. SWART,
FRED KALLUM.